(12) United States Patent
Jacobson (10) Patent No.: US 7,035,834 B2
(45) Date of Patent: Apr. 25, 2006

(54) ENGINE CONTROL SYSTEM USING A CASCADED NEURAL NETWORK

(75) Inventor: Evan Earl Jacobson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 705 days.

(21) Appl. No.: 10/145,131

(22) Filed: May 15, 2002

(65) Prior Publication Data

US 2003/0217021 A1    Nov. 20, 2003

(51) Int. Cl.
   *G06F 15/18* (2006.01)
   *G06G 7/00* (2006.01)

(52) U.S. Cl. .......................................... 706/26; 706/39

(58) Field of Classification Search ................. 706/26, 706/39
   See application file for complete search history.

(56) References Cited

U.S. PATENT DOCUMENTS

| | | | |
|---|---|---|---|
| 4,193,115 A | 3/1980 | Albus | |
| 5,377,112 A | 12/1994 | Brown, Jr. et al. | |
| 5,418,864 A * | 5/1995 | Murdock et al. | ........... 382/309 |
| 5,570,282 A | 10/1996 | Hansen et al. | |
| 5,634,063 A * | 5/1997 | Ahn et al. | .................... 706/25 |
| 5,682,317 A | 10/1997 | Keeler et al. | |
| 5,796,922 A | 8/1998 | Smith | |
| 5,822,741 A * | 10/1998 | Fischthal | ...................... 706/16 |
| 5,825,936 A * | 10/1998 | Clarke et al. | ................ 382/261 |
| 5,832,421 A | 11/1998 | Santoso et al. | |
| 5,857,321 A | 1/1999 | Rajamani et al. | |
| 5,877,954 A * | 3/1999 | Klimasauskas et al. | ....... 700/29 |
| 5,971,747 A | 10/1999 | Lemelson et al. | |
| 6,092,017 A | 7/2000 | Ishida et al. | |
| 6,098,012 A | 8/2000 | Stander et al. | |
| 6,216,083 B1 | 4/2001 | Ulyanov et al. | |
| 6,236,908 B1 | 5/2001 | Cheng et al. | |
| 6,240,343 B1 | 5/2001 | Sarangapani et al. | |
| 6,278,962 B1 | 8/2001 | Klimasauskas et al. | |
| 6,278,986 B1 | 8/2001 | Kamihira et al. | |
| 6,349,293 B1 | 2/2002 | Yamaguchi | |
| 6,401,457 B1 | 6/2002 | Wang et al. | |
| 6,440,067 B1 * | 8/2002 | DeLuca et al. | ............. 600/300 |
| 6,490,571 B1 * | 12/2002 | Cooper | ........................ 706/15 |
| 6,574,613 B1 * | 6/2003 | Moreno-Barragan | ......... 706/16 |
| 2004/0122785 A1* | 6/2004 | Brown et al. | ................. 706/16 |

OTHER PUBLICATIONS

Uno et al, "Repetitively Structured Cascade Neural Network Model Which Generates an Optimal Trajectory", IEEE Proceedings of the 28th Conference on Decision and Control, Dec. 1989.*

Cichpcki et al, "Dual Cascade Networks for Blind Signal Extraction", IEEE ICNN, Jun. 1997.*

* cited by examiner

*Primary Examiner*—George Davis
(74) *Attorney, Agent, or Firm*—Finnegan, Henderson, Farabow, Garrett & Dunner LLP (57) ABSTRACT

A method, system and machine-readable storage medium for monitoring an engine using a cascaded neural network that includes a plurality of neural networks is disclosed. In operation, the method, system and machine-readable storage medium store data corresponding to the cascaded neural network. Signals generated by a plurality of engine sensors are then inputted into the cascaded neural network. Next, a second neural network is updated at a first rate, with an output of a first neural network, wherein the output is based on the inputted signals. In response, the second neural network outputs at a second rate, at least one engine control signal, wherein the second rate is faster than the first rate.

27 Claims, 4 Drawing Sheets

ENGINE CONTROL SYSTEM USING A CASCADED NEURAL NETWORK

TECHNICAL FIELD

The present invention relates generally to systems and methods for monitoring and controlling the operation of internal combustion engines, and more particularly to systems and methods for monitoring and controlling the operation of engines using neural networks.

BACKGROUND

Internal combustion engines have been widely used for many years as power sources in passenger vehicles, tractor trailers, earth movers, military vehicles, etc. As the engines have become more complex and their performance requirements more restrictive, so too have the methods for monitoring the engines and controlling the combustion process. For example, a combustion-type gas turbine has a gas path which typically includes, in a serial-flow relationship, an air intake (or inlet), a compressor, a combustor, a turbine, and a gas outlet (or exhaust nozzle). Sensors located at various locations throughout the gas path provide feedback to one or more proportional-integral-derivative (PID) controllers that then compare the feedback to desired predetermined values. If unexpected differences exist, changes are made to the input variables to return the output values to an acceptable range. PID controllers provide satisfactory control behavior for many single input/single output systems whose dynamics change within a relatively small range. However, efficient operation of modern turbo-charged diesel engines (e.g., to obtain desired fuel economy, establish and maintain a desired power output, and reduce the level of emissions) requires the processing of a number of interrelated, but not easily measured engine and turbine operating parameters to determine optimal settings for fuel flow and distribution, and intake air flow. Since each PID controller has only one input variable and one output variable, they lack the ability to control a system with multivariable input and outputs.

This has led engine designers and manufacturers to explore other, more capable methods to control engine operation. One such method is the use of neural network controllers. Unlike PID (or classical) controllers, neural network controllers solve for an ad hoc control relationship. In other words, neural networks do not need to "know" the governing equations of a specific system they are controlling. A neural network merely needs some set of outputs and inputs accumulated from a system during a learning period to create a control rule for controlling the system in the future. One particularly popular neural network controller, known as a back propagation (BP) neural network includes a plurality of processing elements called neural units arranged in layers with interconnections between units of successive layers. Typically, a BP neural network has an input layer, an output layer, and one or more "hidden" layers in between. The hidden layer is necessary to allow solutions of nonlinear problems. Each unit functions in ways analogous to a biological neuron; a unit is capable of generating an output signal which is determined by the weighted sum of input signals it receives and a threshold specific to that unit. A unit is provided with inputs (either from outside the network or from other units) and uses these to compute a linear or non-linear output. The unit's output goes either to other units in subsequent layers or to outside the network. The input signals to each unit are weighted either positively or negatively, by factors derived in a learning process.

When the weight and threshold factors have been set to correct levels, a complex stimulus pattern at the input layer successively propagates between hidden layers, to result in a simpler output pattern, such as only one output layer unit having a significantly strong output. The network is "taught" by feeding it a succession of input patterns and corresponding expected output patterns. The network "learns" by measuring the difference (at each output unit) between the expected output pattern and the pattern that it just produced. Having done this, the internal weights and thresholds are modified by a learning algorithm to provide an output pattern which more closely approximates the expected output pattern, while minimizing the error over the spectrum of input patterns. Neural network learning is an iterative process, involving multiple "lessons". Neural networks have the ability to process information in the presence of noisy or incomplete data and still generalize to the correct solution.

Even though BP neural networks are often well-suited to accurately model and control engine operation, they are not ideally suited for all such applications. One drawback of BP neural networks is related to the fact that in certain small computer applications, the extensive mathematical manipulations are time-consuming, and thus do not render control possible in real time for an actual physical system. For such applications, system designers in the past have implemented a less capable cerebellar model articulation controller (CMAC) network, which is not as computationally intensive as a BP neural network. CMAC computes control functions by transforming each input variable into a set of intermediate variables, which are combined to select a unique set of weights. These weights are then summed to produce an output. The fact that each possible input vector selects a unique set of memory locations, rather than a unique single location, allows CMAC to generalize (produce similar outputs for similar inputs) by controlling the degree of overlap in the sets of memory locations which are selected for each input vector. Since CMAC networks are not capable of efficiently processing multiple inputs to generate multiple outputs, they are not effective for use in most modern combustion engines.

In the past, one or more neural networks have been linked together or cascaded, to improve their ability to model complex multivariable processes. Unfortunately, the improved processing capabilities have typically resulted in a lower processing throughput by the CPU. For example, U.S. Pat. No. 5,570,282 to Hansen et al., discloses a multivariable nonlinear process controller that includes cascaded controllers for achieving optimal performance when the underlying process includes unmeasured disturbances, modeling errors, and unpredictable process changes. That reference, however, does not disclose the capability to provide increased processing capabilities at speeds normally associated with less capable neural networks.

Therefore a control system is needed that can perform robust calculations associated with BP neural networks, and provide them with the speed normally associated with CMAC networks.

SUMMARY OF THE INVENTION

In accordance with embodiments of the present invention, a method for monitoring an engine using a cascaded neural network that includes a plurality of neural networks is disclosed. The method includes the steps of storing in a memory, data corresponding to a cascaded neural network including a plurality of instructions executable by an engine control monitor and data representing weights corresponding to a plurality of nodes of the cascaded neural network. Signals generated by a plurality of engine sensors are then inputted into the cascaded neural network. Next, a second neural network inside the cascaded neural network is updated at a first rate, with an output of a first neural network, wherein the output is based on the inputted signals. The cascaded neural network then outputs at a second rate, at least one engine control signal from the second neural network, wherein the second rate is faster than the first rate. The present invention also includes a machine-readable storage medium having stored thereon machine executable instructions, the execution of the instructions adapted to implement the foregoing method.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 1:
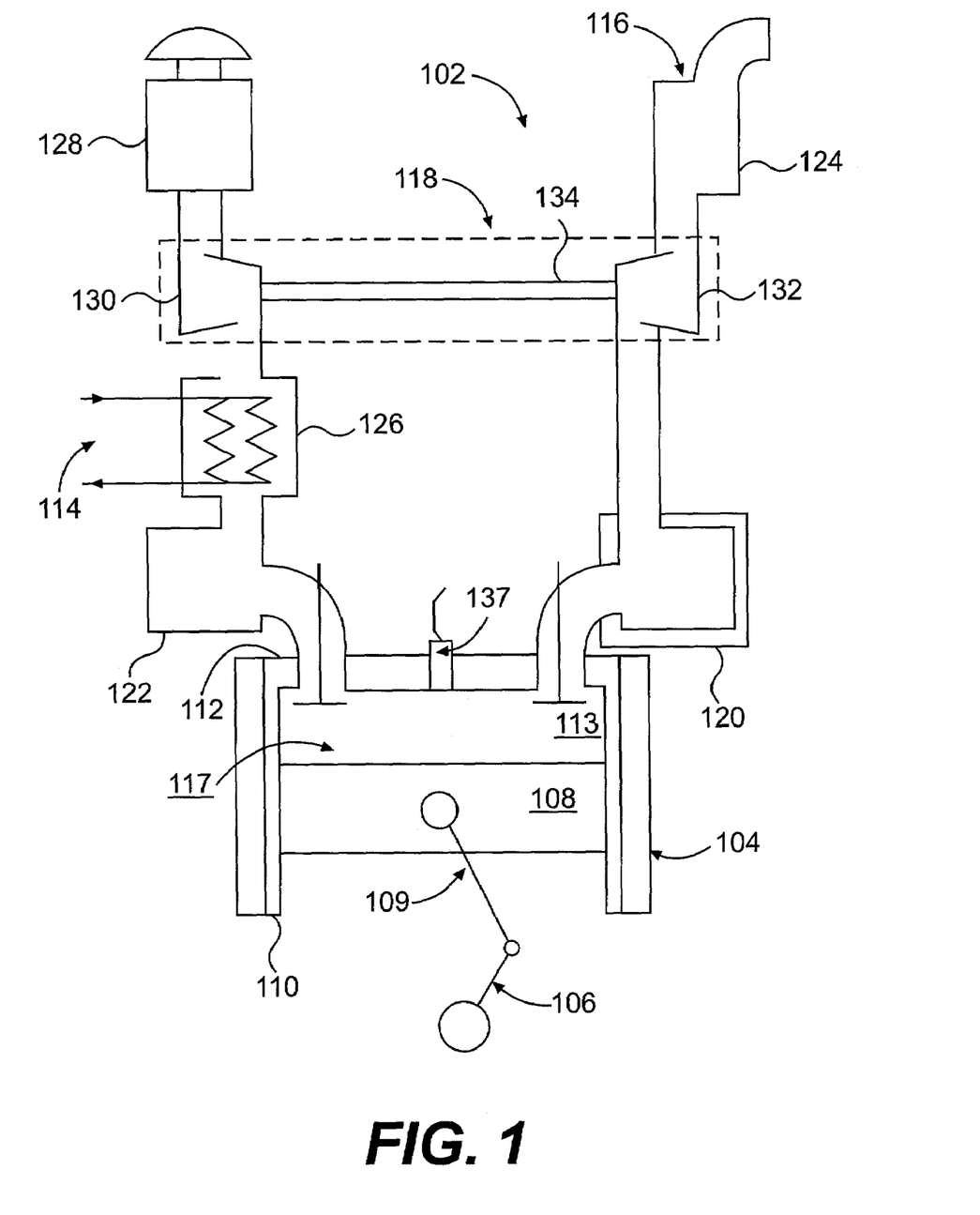
FIG. 1 is a diagrammatic and schematic representation of an exemplary engine in accordance with an embodiment of the present invention.

With reference to FIG. 1, embodiments of the present invention are adapted to monitor and control an engine. As shown in FIG. 1, an engine 102 includes an air intake system 114, an exhaust system 116, a combustion system 117, and a turbocharger 118. The air intake system 114 may include an air filter or cleaner 128, an aftercooler 126, and an air intake manifold 122. The exhaust system 116 may include an exhaust manifold 120 and a muffler 124.

The turbocharger 118 may include a compressor 130, a turbine 132, and a shaft 134. The compressor 130 is connected to the air intake system 114 between the aftercooler 126 and the air filter 128. The turbine 132 is connected into the exhaust system 116 between the exhaust manifold 120 and the muffler 124. A shaft 134 connects the compressor 130 to the turbine 132.

The combustion system 117 includes at least one cylinder 104 and a crankshaft 106. Each cylinder 104 typically has an associated piston 108 and connecting rod 109. For the purposes of illustration, only one cylinder 104, piston 108, and connecting rod 109 are shown. Each cylinder 104 typically includes a cylinder liner 110. Each cylinder 104 may also include a cylinder head 112, or a common head arrangement is used. The piston 108, cylinder liner 110, and cylinder head 112 form a combustion chamber 113. The cylinder head 112 forms a passageway from the air intake manifold 122 and the exhaust manifold 120 to the combustion chamber 113. The cylinder head 112 also forms a passageway allowing a fuel delivery system to introduce fuel into the combustion chamber 113. In one exemplary embodiment, fuel is injected into the combustion chamber 113 by an electronic fuel injector 137, although other types of fuel injectors or fuel delivery systems (e.g., a carburetor) could also be used.

Engine 102 includes a plurality of sensors (not shown) operable for sensing a variety of response parameters of the engine, such as, but not limited to; barometric pressure, inlet ambient temperature, intake manifold temperature/pressure, pilot quantity, injection duration, engine speed, rate of fuel delivery to the engine, ratio of air to fuel delivery to the engine, fuel temperature, oil pressure, oil temperature, engine speed, and exhaust temperature. Turbocharger 118 may include sensors (not shown) for sensing other response parameters (e.g., compressor outlet temperature/pressure, turbine inlet temperature/pressure, and the boost pressure). A torque converter (not shown), is indirectly coupled to crankshaft 106, and may include a sensor for sensing torque at the torque converter. All of the sensors can be of a variety of designs known in the industry.

Figure 2:
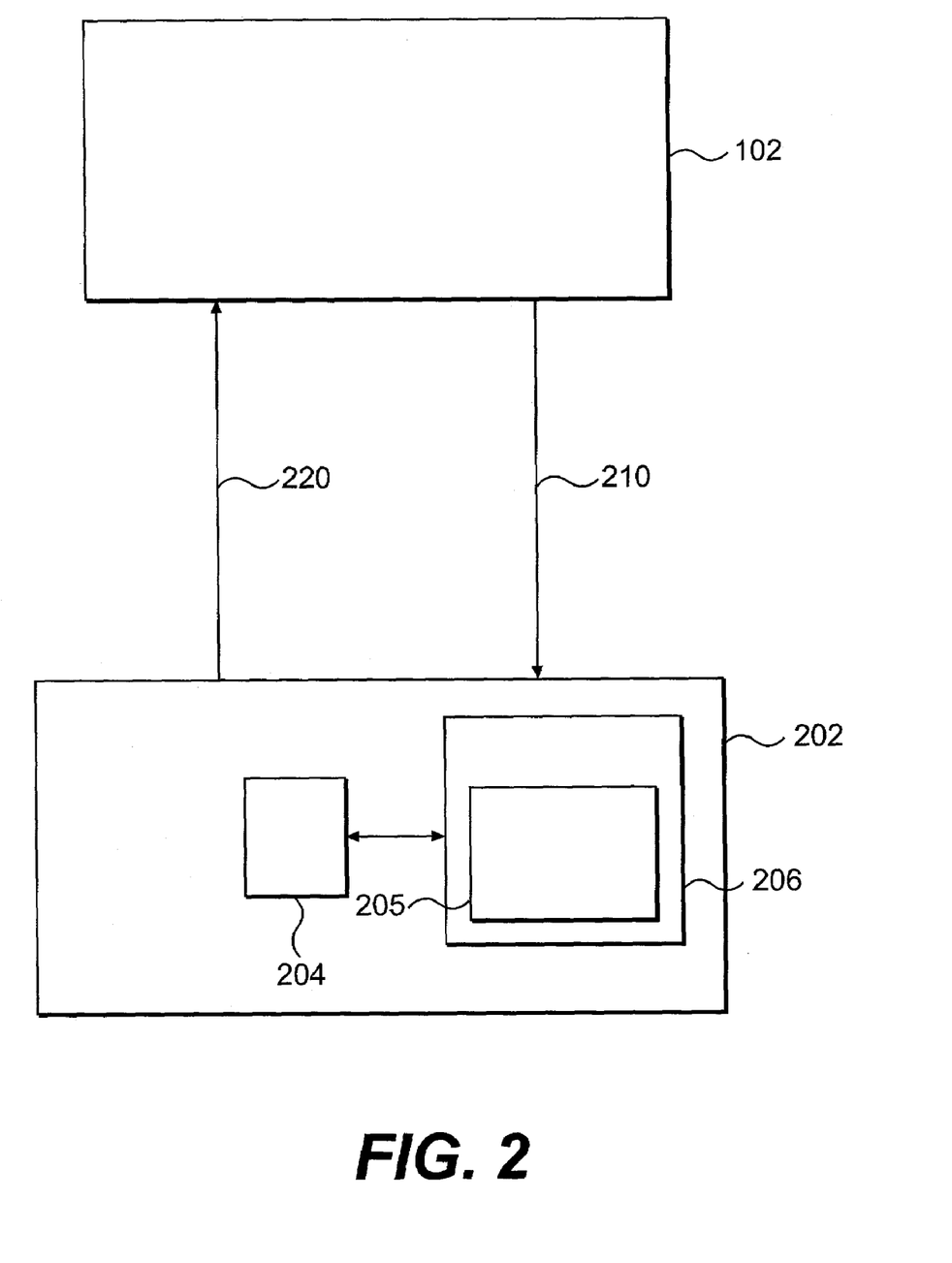
FIG. 2 is a diagrammatic and schematic representation of an exemplary engine and engine control module (ECM) in accordance with an embodiment of the present invention.

The operation of engine 102 is governed by an engine control module 202 (ECM), as shown in FIG. 2 according to one embodiment of the invention. Engine control module 202 includes a CPU 204 and a memory 206. There are other components as well, but these are not shown to facilitate description of the unique aspects of this embodiment of the invention. CPU 204 includes a microprocessor capable of modeling and operation of a neural network using sensor outputs 210 from the above discussed sensors as inputs and generating at least one control signal 220 for feedback to engine 102. Memory 206 includes a plurality of software routines 205 that receive the information from the various sensors throughout the engine and pass this information through engine control algorithms stored in ECM 202. In one embodiment, software routines 205 include a plurality of modules (not shown) for interfacing with engine 102. Sensor outputs 210 are transmitted to ECM 202 from engine 102. ECM 202 then generates control signals 220 in response to the sensor outputs 210. Once generated, control signal 220 is then passed from ECM 202 to engine 102 to control its operation. Each control signal 220 has a specific purpose and is intended to communicate a unique message to engine 102. For example, ECM 202 may output one torque control signal to the transmission at a first frequency (e.g., every 15 ms) and output a second control signal to a fuel injector control mechanism at a second frequency (e.g., every 120 ms).

Figure 3:
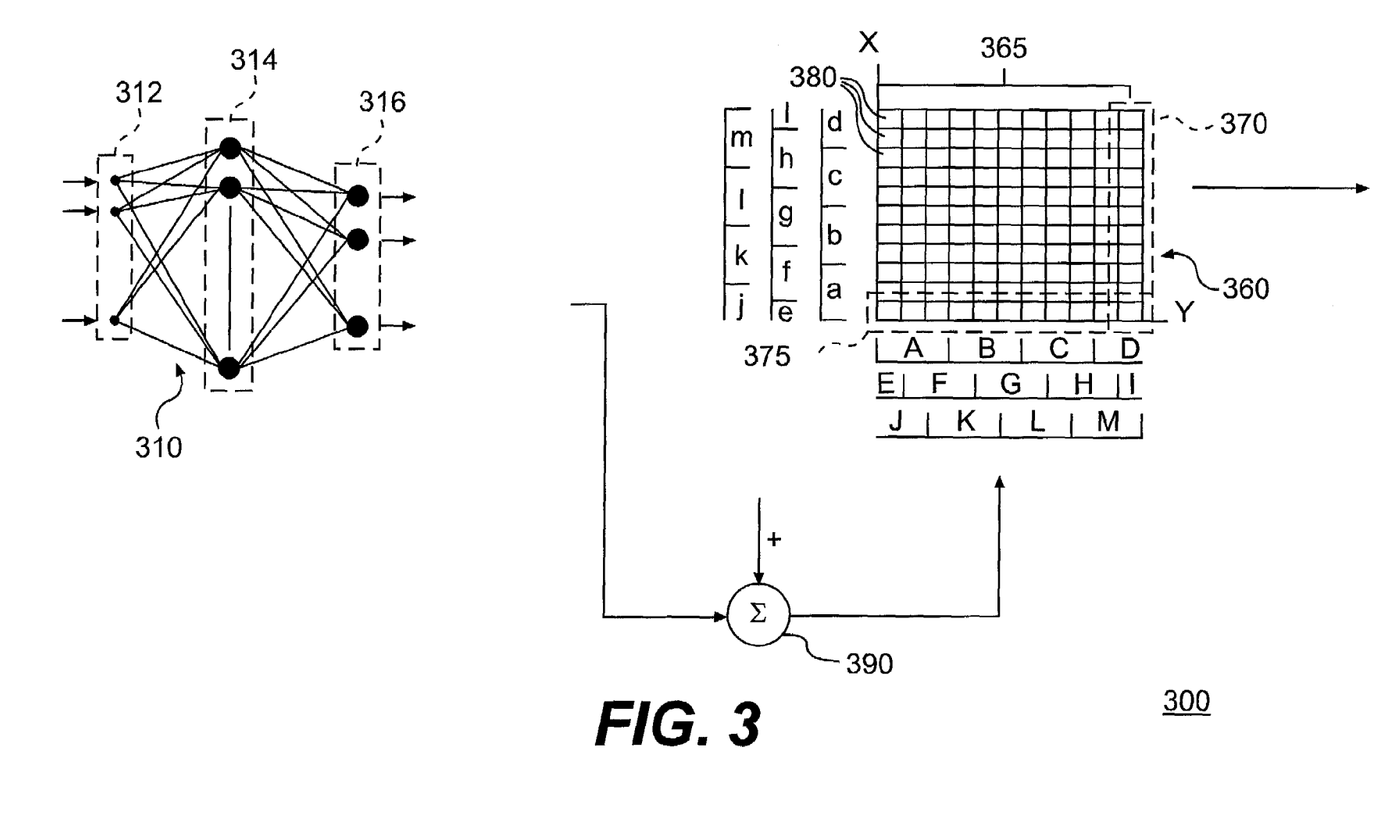
FIG. 3 is a diagram of a cascaded neural network in accordance with one embodiment of the present invention.

Referring now to FIG. 3, there is shown a cascaded neural network 300 in accordance with one exemplary embodiment of the present invention. In operation, cascaded neural network 300 accepts several inputs, performs a series of operations on the inputs, and produces one or more outputs. As is well known in the art, a neural network such as cascaded neural network 300 is a simulation of the biological neural network of the human brain. Here, cascaded neural network 300 includes at least two neural networks for processing signals received from the plurality of engine sensors. Signals from the engine sensors are input to one or more of the cascaded neural networks. When one neural network processes the input(s), it outputs at least one processed signal into a second neural network, creating a cascading effect. Signals output from cascaded neural network 300 may come from one of the two neural networks (in other words, all the signals from the first neural network are fed into the second neural network which then generates the outputs of cascaded neural network), or the signals may come from both neural networks (i.e., the first neural network may output some of its signals into the second neural network and the others will be outputted to ECM 202). Signals generated by each of the neural networks that constitute the cascaded neural network are generated simultaneously, or they are generated asynchronously.

While this specification may describe cascaded neural network 300 as including two neural networks, one of skill in the art will appreciate that the cascaded neural network may include several neural networks cascaded together, and may further include at least one neural network cascaded to a complex polynomial (e.g., Ax+By=C) without departing from the spirit and scope of the present invention. In operation, the neural network will update the coefficients (or weights) associated with the variables x and y, and ECM 202 will periodically output a value for C.

In FIG. 3, cascaded neural network 300 includes a back propagation (BP) neural network 310 cascaded into a cerebellar model articulation controller (CMAC) neural network 360. Other types of neural networks may also be used. Here, BP neural network 310 consists of three layers: an input layer 312; a hidden layer 314; and an output layer 316. As shown in FIG. 3, input layer 312 includes three inputs representing an input pattern to BP neural network 310.

The input layer 312 is connected through weights to hidden layer 314, the hidden layer in turn being connected to output layer 316 through weighted connections. The number of hidden nodes and hidden layers can be any variable number and are obtained through trial and error to determine the number of hidden nodes and hidden layers that provides optimal results. As shown in FIG. 3, in the illustrated embodiment, the output layer 316 includes three outputs representing an output pattern of the neural network. In one exemplary embodiment, the input layer 312 may include engine speed, fuel injection quantity (pilot quantity and main fuel quantity) and timing, and the output layer 316 may include fuel rate. In another exemplary embodiment, the input layer 312 may include engine speed, barometric pressure, intake manifold pressure and temperature, and the output layer 316 may include exhaust manifold temperature. In another exemplary embodiment, the input layer 312 may include engine speed, injection quantity (pilot quantity and main fuel quantity) and timing, and the output layer 316 may include torque. In yet another exemplary embodiment, the input layer 312 may include engine speed, barometric pressure, intake manifold pressure and temperature, and the output layer 316 may include turbo speed. In still another exemplary embodiment, the input layer 312 may include engine speed, injection quantity (pilot quantity and main fuel quantity) and timing, and the output layer 316 may include Nitrogen Oxide ($NO_x$) production. As shown, output of BP neural network 310 is transmitted directly to ECM 202 and/or it is transmitted to CMAC neural network 360.

CMAC neural network 360 includes a data space 365 including a plurality of columns 370 and a plurality of rows 375, each column 370 being identifiable by a unique three-letter combination (A–M) indicated at the bottom of data space 365, and each row 375 being identifiable by a unique three-letter combination (a–m) indicated at the left side of data space 365. The column and row combination results in a plurality of cells 380. When the plurality of cells 380 are populated with data representative of a particular engine's operating characteristics, data space 365 is a comprehensive map that characterizes performance of a vehicle component as a function of predetermined design and control parameters. Each cell 380 is identified by a corresponding six letter designation (three large letters and three small letters). The six-letter designation for each cell is determined by drawing an imaginary straight line from the cell to the X axis (through the letters adjacent to the X axis), and drawing another imaginary straight line from the cell to the Y axis (through the letters adjacent to the Y axis). The six letters that intersect the two lines are the six-letter designation for the cell. In addition to uniquely identifying each cell, the six-letter designation represents the weights to be applied to a given cell. Accordingly, the plurality of cells 380 include six (6) corresponding weight values. For example, the cell in the upper right corner of data space 365 could be identified as "M-I-D-m-i-d". That six-letter combination and the weights associated with each of those six letters is unique to that particular cell. In an untrained neural network, the numeric value associated with each cell 380 is randomly assigned. In a trained neural network, the numeric values are determined by training the neural network of which the neuron is a part by ways known to those skilled in the art.

Before cascaded neural network 300 is utilized to control operation of an engine, it must be trained. In one embodiment, cascaded neural network 300 is trained during normal operation of engine 102. In operation, ECM 202 is used for monitoring and controlling engine 102 with the following steps. First, a plurality of initial values or model constants are determined for selected engine operating conditions. A plurality of modeled engine responses are then determined as a function of the selected control signals and initial values. Then, during subsequent operation of engine 102, sensor outputs 210 are sensed and a difference is determined between the sensed outputs 210 and the modeled engine values. These differences are used adjust the weights of the neural network. In a back-propagation neural network, the error values are back-propagated to adjust the weights, and in a CMAC neural network, the error value is divided by the number of weights and applied equally to each weight.

Figure 4:
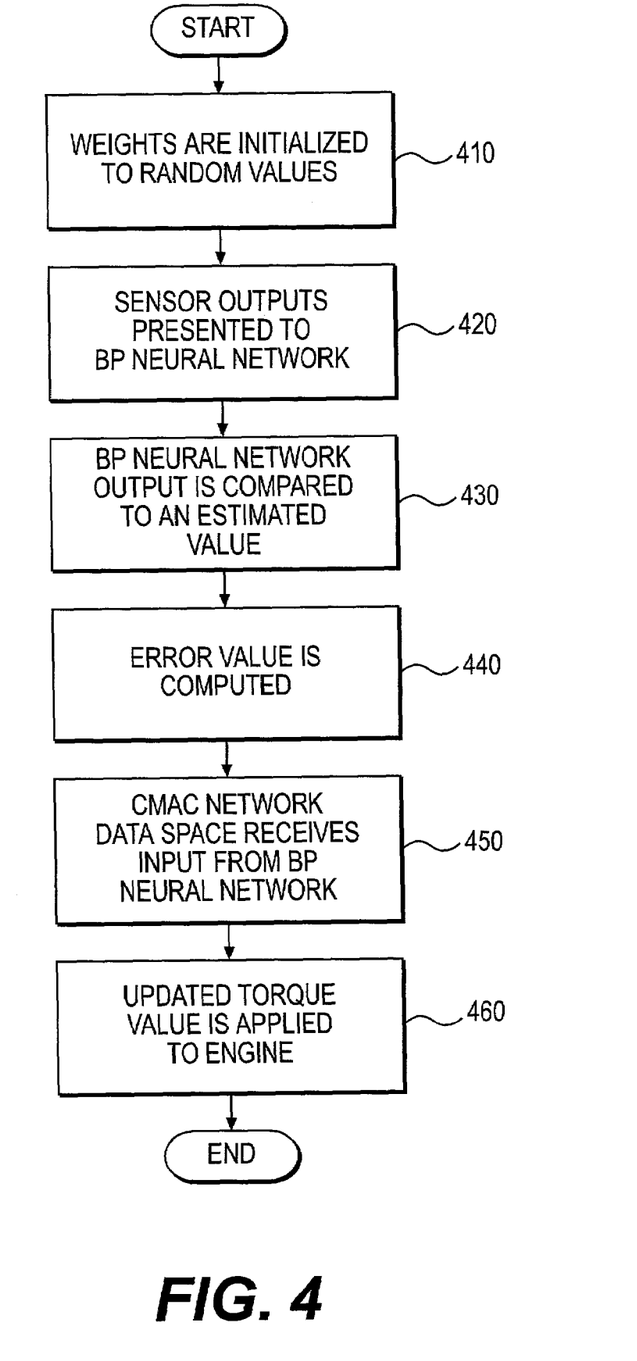
FIG. 4 is a flowchart showing the general operation of one exemplary embodiment of the present invention.

Referring now to FIG. 4, there is shown a high level flow chart of an exemplary method for monitoring and controlling an engine using a cascaded neural network according to one embodiment of the invention. At start-up, the weights are initialized to random values, which are either positive or negative integers or fractions (step 410). Start-up refers to the initialization of cascaded neural network 300. When engine 102 is shut down, it is contemplated that the previously-computed weights are stored in non-volatile memory such that they are recalled when the engine is subsequently restarted, although they need not be. Cascaded neural network 300 is initialized (or started up) numerous times throughout the life of engine 102, or it may only be initialized once such that the weight values will be changed only through training. Once cascaded neural network 300 is initialized, the inputs obtained from the sensor outputs are presented to BP neural network 310 and processed (step 420). In a second exemplary embodiment, inputs obtained from the sensor outputs are presented to BP neural network 310 and/or CMAC neural network 360. After BP neural network 310 completes processing, the output pattern for one or more sensor outputs 210 is compared to the output of CMAC neural network 360 for the same engine response (step 430). For example, BP neural network 310 may compute one value for torque, and CMAC neural network 360 may compute a second value. The value extracted from CMAC neural network 360 is obtained by entering data space 365 using the set or some subset of the sensor outputs presented to the BP neural network 310, e.g., two current sensed signals (e.g., ERPM and fuel quantity) corresponding to X and Y coordinates in data space 365. The two torque values are compared to each other (Σ 390 in FIG. 3) and an error value representative of the difference between the value obtained from BP neural network 310 and the value obtained from CMAC neural network 360 is computed (step 440).

In one embodiment, the error value is then divided by six and applied to weights corresponding to the cell identified in CMAC neural network 360 (step 450). For example, if the cell identified has the following six weights associated with it (M-I-D-m-i-d) before the error value is computed, those six weights will each be adjusted by the number represented by the total error divided by 6, such that the output from CMAC network 360 with the new weights applied, is identical to the output from BP neural network 310 for the current sensed signals. At predetermined times, an updated signal for torque is computed and outputted from ECM 202 (Step 460). The engine 102 is thus controlled as a function of the output pattern of CMAC network 360. In one embodiment, weights associated with each cell of CMAC neural network 360 are updated at a first frequency, and ECM 202 may output a control signal (e.g., torque) at a second frequency. In a second embodiment, weights are updated and control signals outputted at the same frequency.

Although embodiments of the invention have been described herein in conjunction with a conventional engine, it could also be used with a free-piston engine or rotary engine with appropriate modifications that are apparent to those skilled in the art.

INDUSTRIAL APPLICABILITY

The present apparatus and method for monitoring and controlling an engine using cascaded neural networks may have utility for a wide variety of machine applications wherein real time, on board diagnosis of general operating conditions, multiple fault conditions, and individual fault conditions is desired. One aspect of the embodiments of the present invention is the capability to provide usable inputs to the neural network as a function of the initial values and sensed parameters, and to update the initial values and network weights at differing speeds depending on control module requirements.

The cascaded neural network is used as a virtual sensor to predict engine conditions, such as, for example, fuel rate, exhaust temperature, turbo speed, and engine torque as a function of available hardware sensor feedback signals. The cascaded neural network of the present invention may also calculate the amount of various Nitrogen Oxides ($NO_x$) generated and output a signal to adjust injection timing to control $NO_x$ emissions. Embodiments of the present invention may also be used to calculate exhaust manifold temperature and output a signal to adjust the fuel consumption to control exhaust temperature.

When excessive values of determined conditions are predicted, the engine is de-rated to the extent necessary to satisfy design limits. The present invention provides this capability without additional physical sensors by utilizing a back propagation neural network cascaded with a second neural network (or complex polynomial). By limiting the number of excessive exhaust temperature and turbo speed instances, there are less failures of the exhaust manifold and turbine housings, resulting in reduced warranty claims and higher customer satisfaction. Additional potential benefits of predicting fuel rate and engine torque with embodiments of the present invention are more accurate fuel consumption estimation and more precise shift control for automatic transmission applications.

Because a BP neural network is so computationally intensive, a typical ECM is only capable of outputting updated signals from a BP neural network relatively slowly, e.g., once every 120 ms. To provide predetermined engine subsystems (e.g., transmission) with updated values (e.g., torque) at rates much faster than normally associated with BP neural networks, the embodiments of the present invention is adapted to compute error values at one rate and to output updated desired signals (e.g., torque) at much faster rates. For example, if BP neural network 310 is capable of outputting a new error value for torque every 120 ms, but a processor associated with the transmission requires updated torque signals every 15 ms, the present system will output torque signals from the CMAC network 360 at the required frequency, with updated weights provided to CMAC network 360 (or complex polynomial) based on the output of the BP neural network 310 once for every eighth torque output. In this way, data is provided to a transmission subsystem at a rate that is much faster than normally associated with a BP neural network and that is more precise than usually associated with CMAC networks.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for monitoring an engine using a cascaded neural network that includes a plurality of neural networks, the method comprising:
   storing in a memory, data corresponding to the cascaded neural network;
   inputting signals generated by a plurality of engine sensors into the cascaded neural network;
   updating at a first rate, a second neural network with an output of a first neural network, wherein said output is based on the inputted signals; and
   outputting at a second rate, at least one engine control signal from the second neural network,
   wherein the second rate is faster than the first rate.

2. The method of claim 1, wherein the data corresponding to the cascaded neural network comprises a plurality of interconnected nodes and a plurality of weights corresponding to the nodes.

3. The method of claim 1, further comprising adjusting at least one engine response parameter based on the output from the second neural network.

4. The method of claim 1, wherein inputting signals further includes inputting signals generated by a plurality of engine sensors into one of a plurality of neural networks in the cascaded neural network.

5. The method of claim 1, wherein inputting signals further includes:
   inputting signals generated by at least one engine sensor into a first of a plurality of neural networks in the cascaded neural network; and
   inputting signals generated by at least one engine sensor into at least the second neural network.

6. The method of claim 1, wherein outputting further comprises:
   outputting at least one engine control signal from the first of a plurality of neural networks in the cascaded neural network; and
   outputting at least one engine control signal from the second neural network.

7. The method of claim 1, wherein the output of the first neural network is indicative of exhaust temperature and the engine control signal is one of fuel injection timing or fuel injection quantity.

8. The method of claim 1, wherein the output of the first neural network is indicative of a nitrogen oxide ($NO_x$) emission and the engine control signal is fuel injection timing.

9. A method for monitoring an engine, comprising:
storing in a memory, data corresponding to at least two neural networks;
inputting signals generated by a plurality of engine sensors into a first neural network;
outputting at least one engine control signal from the first neural network at a first rate; and
outputting at least a second engine control signal from the second neural network at a second rate, wherein the at least second signal is dependent on a second output from the first neural network and the second rate is faster than the first rate.

10. The method of claim 9, further comprising:
adjusting at least one engine response parameter based on the outputted first value from the first neural network; and
adjusting the at least second engine response parameter based on the outputted second value from the second neural network.

11. A method for monitoring an engine, comprising:
storing in a memory, data corresponding to at least one neural network and data corresponding to a polynomial;
inputting signals generated by a plurality of engine sensors into a first neural network;
updating a polynomial with an output of the first neural network at a first rate; and
outputting at least one engine control signal from the polynomial at a second rate,
wherein the second rate is faster than the first rate.

12. A machine-readable storage medium having stored thereon machine executable instructions, the execution of said instructions adapted to implement a method for monitoring an engine using a cascaded neural network that includes a plurality of neural networks, the method comprising:
storing in a memory, data corresponding to the cascaded neural network;
inputting signals generated by a plurality of engine sensors into the cascaded neural network;
updating at a first rate, a second neural network with an output of a first neural network, wherein said output is based on the inputted signals; and
outputting at a second rate, at least one engine control signal from the second neural network,
wherein the second rate is faster than the first rate.

13. The machine-readable storage medium of claim 12, wherein the data corresponding to the cascaded neural network comprises a plurality of interconnected nodes and a plurality of weights corresponding to the nodes.

14. The machine-readable storage medium of claim 12, further comprising adjusting at least one engine response parameter based on the output from the second neural network.

15. The machine-readable storage medium of claim 12, wherein inputting further comprises inputting signals generated by a plurality of engine sensors into at least one of a plurality of neural networks in the cascaded neural network.

16. The machine-readable storage medium of claim 12, wherein inputting signals further comprises:
inputting signals generated by at least one engine sensor into a first of a plurality of neural networks in the cascaded neural network; and
inputting signals generated by at least one engine sensor into at least a second neural network.

17. The machine-readable storage medium of claim 12, wherein outputting further comprises:
outputting at least one engine control signal from a first of a plurality of neural networks in the cascaded neural network; and
outputting at least one engine control signal from a second neural network.

18. A machine-readable storage medium having stored thereon machine executable instructions, the execution of said instructions adapted to implement a method for monitoring an engine, the method comprising:
storing in a memory, data corresponding to at least two neural networks;
inputting signals generated by a plurality of engine sensors into a first neural network;
outputting at least a first engine control signal from the first neural network at a first rate; and
outputting at least a second engine control signal from the second neural network at a second rate, wherein the at least second signal is dependent on a second output from the first neural network and the second rate is faster than the first rate.

19. The machine-readable storage medium of claim 18, further comprising:
adjusting at least a first engine response parameter based on the outputted first signal from the first neural network; and
adjusting at least a second engine response parameter based on the outputted second signal from the second neural network.

20. The machine-readable storage medium of claim 18, wherein the output from the first neural network occurs at a first time; and the output from the second neural network occurs at a second time.

21. A machine-readable storage medium having stored thereon machine executable instructions, the execution of said instructions adapted to implement a method for monitoring an engine, the method comprising:
storing in a memory, data corresponding to at least one neural network and data corresponding to a polynomial;
inputting signals generated by a plurality of engine sensors into a first neural network;
updating a polynomial with an output of the first neural network at a first rate; and
outputting at least one engine control signal from the polynomial at a second rate,
wherein the second rate is faster than the first rate.

22. An apparatus for monitoring an engine using a cascaded neural network that includes a plurality of neural networks, the apparatus comprising:
a microprocessor that includes data corresponding to the cascaded neural network;
a module configured to receive signals generated by a plurality of engine sensors into the cascaded neural network;
a module configured to update at a first rate, a second neural network with an output of a first neural network, wherein said output is based on the inputted signals; and a module configured to output at a second rate, at least one engine control signal from the second neural network, wherein the second rate is faster than the first rate.

23. The apparatus of claim 22, wherein the plurality of modules comprise functionally related computer program code and data.

24. An apparatus for monitoring an engine, the apparatus comprising:
- a microprocessor that includes data corresponding to at least two neural networks;
- a module configured to receive signals generated by a plurality of engine sensors into a first neural network;
- a module configured to output at least a first engine control signal from the first neural network at a first rate; and
- a module configured to output at least a second engine control signal from the second neural network at a second rate, wherein the at least second signal is dependent on a second output from the first neural network and the second rate is faster than the first rate.

25. The apparatus of claim 24, wherein the plurality of modules comprise functionally related computer program code and data.

26. An apparatus for monitoring an engine, the apparatus comprising:
- a microprocessor that includes data corresponding to at least one neural network and data corresponding to a polynomial;
- a module configured to store in a memory, data corresponding to at least one neural network and data corresponding to a polynomial;
- a module configured to receive signals generated by a plurality of engine sensors into a first neural network;
- a module configured to update a polynomial with an output of the first neural network at a first rate; and
- a module configured to output at least one engine control signal from the polynomial at a second rate, wherein the second rate is faster than the first rate.

27. The apparatus of claim 26, wherein the plurality of modules comprise functionally related computer program code and data.

* * * * *